US012120807B2

(12) United States Patent
Kronstedt et al.

(10) Patent No.: US 12,120,807 B2
(45) Date of Patent: Oct. 15, 2024

(54) MECHANICAL ALIGNMENT OF X-RAY SOURCES

(71) Applicant: Excillum AB, Kista (SE)

(72) Inventors: Johan Kronstedt, Kista (SE); Ulf Lundström, Kista (SE); Per Takman, Kista (SE)

(73) Assignee: Excillum AB, Kista (SE)

( * ) Notice: Subject to any disclaimer, the term of this patent is extended or adjusted under 35 U.S.C. 154(b) by 0 days.

(21) Appl. No.: 18/471,588

(22) Filed: Sep. 21, 2023

(65) Prior Publication Data

US 2024/0015875 A1 Jan. 11, 2024

Related U.S. Application Data

(63) Continuation of application No. 17/290,580, filed as application No. PCT/EP2019/080022 on Nov. 4, 2019, now Pat. No. 11,800,625.

(30) Foreign Application Priority Data

Nov. 5, 2018 (EP) .................................... 18204286

(51) Int. Cl.
*H05G 2/00* (2006.01)

(52) U.S. Cl.
CPC ............. *H05G 2/005* (2013.01); *H05G 2/003* (2013.01)

(58) Field of Classification Search
CPC ............................... H05G 2/003; H05G 2/005
See application file for complete search history.

(56) References Cited

U.S. PATENT DOCUMENTS

| | | | | |
|---|---|---|---|---|
| 3,836,805 A | 9/1974 | Kok | | |
| 6,324,255 B1 * | 11/2001 | Kondo | H05G 2/003 378/119 | |
| 10,818,468 B1 * | 10/2020 | Hansson | H01J 35/18 | |

(Continued)

FOREIGN PATENT DOCUMENTS

| | | |
|---|---|---|
| EP | 3 214 635 A1 | 9/2017 |
| EP | 3493239 A1 | 6/2019 |

OTHER PUBLICATIONS

Extended European Search Report dated Nov. 6, 2023 issued by the European Patent Office in corresponding European Application No. 23184068.7-1212, (7 pages).

(Continued)

*Primary Examiner* — Chih-Cheng Kao
(74) *Attorney, Agent, or Firm* — Buchanan Ingersoll & Rooney PC

(57) ABSTRACT

X-ray sources including an electron source, an adjustment means for adjusting an orientation of the electron beam generated by the electron source, a focusing means configured to focus the electron beam in accordance with a focusing setting, a beam orientation sensor arranged to generate a signal indicating an orientation of the electron beam relative to a target position, and a controller that is operably connected to the focusing means, the beam orientation sensor and the adjustment means. Also, X-ray sources including a target orientation sensor and a target adjustment means, wherein the controller is configured to cause the beam adjustment means and/or target adjustment means to adjust the relative orientation between the electron beam and the target.

5 Claims, 5 Drawing Sheets

(56) References Cited

U.S. PATENT DOCUMENTS

| | | | | |
|---|---|---|---|---|
| 2004/0195529 | A1* | 10/2004 | Hergenhan | H05G 2/003 250/504 R |
| 2013/0301805 | A1* | 11/2013 | Hemberg | H05G 1/52 378/137 |
| 2015/0179388 | A1 | 6/2015 | Hemberg et al. | |
| 2021/0410260 | A1 | 12/2021 | Kronstedt et al. | |

OTHER PUBLICATIONS

International Search Report (PCT/ISA/210) with translation and Written Opinion (PCT/ISA/237) mailed on Feb. 12, 2020, by the European Patent Office as the International Searching Authority for International Application No. PCT/EP2019/080022.

* cited by examiner

MECHANICAL ALIGNMENT OF X-RAY SOURCES

CROSS-REFERENCE TO RELATED APPLICATIONS

This application is a continuation of and claims priority to U.S. patent application Ser. No. 17/290,580, filed on Apr. 30, 2021, which is the United States National phase under 35 U.S.C. § 371 of PCT International Patent Application Serial No. PCT/EP2019/080022, filed on Nov. 4, 2019.

TECHNICAL FIELD

The invention disclosed herein generally relates to an electron-impact X-ray source in which an electron beam interacts with a target to generate X-ray radiation. In particular, the invention relates to techniques and devices for improving the alignment of the electron beam and the target.

BACKGROUND

X-ray radiation may be generated by directing an electron beam onto a target. In such systems, an electron source comprising a high-voltage cathode is utilized to produce an electron beam that impinges on the target at a target position inside a vacuum chamber. The X-ray radiation generated by the interaction between the electron beam and the target may leave the vacuum chamber through an X-ray window separating the vacuum chamber from the ambient atmosphere.

The relative orientation between the electron beam and the target is known to be an important factor affecting the performance of the X-ray source. A poor or erroneous alignment may lead to a reduced power and quality of the generated X-ray radiation; and may potentially render the entire system inoperable.

The relative alignment of the electron beam and the target may deteriorate by maintenance and replacement of parts of the system, but also by wear. As a result, the operator or service engineer has to deal with cumbersome and time-consuming alignment and adjustment in connection with maintenance of the X-ray source, leading to long downtime periods for the system.

Thus, there is a need for an improved technology that reduce the downtime of the X-ray source.

SUMMARY

It is an object of the present invention to provide an X-ray technology addressing at least some of the above shortcomings. A particular object is to provide an X-ray source and method allowing for a facilitated alignment of the electron beam and/or target.

The relative positions or directions of the electron beam and the target may be referred to as alignment. A correct alignment is required in order for the electron beam to hit the target at the intended target position, and in order for the generated X-ray radiation to be directed towards a desired location. The alignment of the electron beam and/or the target may however deteriorate over time, for example due to maintenance, wear or replacement of mechanical parts of the X-ray source.

According to a first aspect of the present invention there is provided an X-ray source configured to emit X-ray radiation upon interaction between an electron beam and a target, wherein the X-ray source comprises an electron source having a cathode configured to emit electrons and an anode electrode configured to accelerate the emitted electrons to form the electron beam. Further, the X-ray source comprises an adjustment means configured to adjust a relative orientation between the anode electrode and the cathode of the electron source, a focusing means configured to focus the electron beam on the target in accordance with a focusing setting, a beam orientation sensor arranged to generate a signal indicating an orientation of the electron beam relative to a sensor area, and a controller operably connected to the focusing means, the beam orientation sensor and the adjustment means. The controller is configured to cause the adjustment means to adjust the relative orientation between the anode electrode and the cathode so that the signal received from the sensor changes within a predetermined interval when the focusing setting is changed.

According to a second aspect, a method for aligning an X-ray source is provided, in which electrons are emitted from a cathode and accelerated by means of an anode electrode to form an electron beam. The electron beam is focused by applying at least two focusing settings to a focusing coil. Further, a signal is generated, indicating an orientation of the electron beam relative to a sensor area for the at least two focusing settings, and a relative orientation between the anode electrode and the cathode is adjusted so that a difference between the generated signal for the at least two focusing settings is within a predetermined interval.

Since the electrons are accelerated by the field between the anode electrode and the cathode, it is appreciated that the relative orientation of the anode electrode and the cathode can be employed to affect the direction by which the generated electron beam leaves the electron source. Thus, by moving the anode electrode in relation to the cathode, or vice versa, the adjustment means allows for the alignment of the electron beam to be adjusted accordingly.

The beam orientation sensor may be employed for determining the effect or impact of the adjustment means on the electron beam. In other words, the beam orientation sensor may be used for measuring—directly or indirectly—a position or direction of the electron beam in relation to a desired or ideal direction or position. Preferably, the orientation of the electron beam may be studied with reference to the position of the target, or the point in space in which the interaction between the electron beam and the target is intended to take place. The output of the sensor may be used as input for controlling other parts of the X-ray source, such as the adjustment means, and hence form part of a closed loop or feedback control of the alignment. The beam orientation sensor may for example be realized by an electron-optical means measuring the actual electron beam, an electron detector or sensor receiving the electrons of the beam, or means for observing X-rays or electrons generated upon impact with the target. Further examples and implementations will however be discussed in connection with different embodiments of the invention.

According to a third aspect, an X-ray source is provided, comprising an electron source adapted to provide an electron beam directed towards a target such that the electron beam interacts with the target to generate X-ray radiation, a target orientation sensor configured to generate a signal indicating an orientation of the target relative to the electron beam, and a target adjustment means configured to adjust the orientation of the target relative to the electron beam. Further, a controller is provided, which is operably connected to the target orientation sensor and the target adjustment means and configured to cause the target adjustment means to adjust the orientation of the target based on the signal received from the target orientation sensor.

According to a fourth aspect, a method for aligning an X-ray source is provided. The method comprises providing an electron beam directed towards a target such that the electron beam interacts with the target to generate X-ray radiation, generating a signal indicating an orientation of the target relative to the electron beam, and adjusting the orientation of the target based on the generated signal.

The target of the X-ray source may be a solid target, such as a rotating or stationary target. The target may also be formed of a liquid jet, such as a liquid metal jet, propagating through an interaction region in which the electron beam may impact on the target.

By using a target orientation sensor, the position of the target in relation to the electron beam (or in relation to the point in space in which the interaction between the target and the electron beam is intended to take place) can be determined. This allows for the orientation of the target and, possibly, the orientation of the electron beam, to be adjusted so as to achieve a desired or improved alignment. The target orientation sensor may for example be formed of an electron sensor arranged behind the target as seen in a downstream direction of the electron beam. Alternatively, the target position may be determined relative a known electron beam position by observing backscattered electron or X-ray radiation generated by the interaction between the electron beam and the target. A poor or incorrect alignment may for example be manifested as a relatively low generation of X-ray radiation and backscattered electrons. Hence, the target orientation sensor may, for example, monitor an intensity of the electron beam downstream of the target, an intensity of electrons scattered from the target, or an intensity of X-ray radiation generated by the interaction between the electron beam and the target. The target is preferably a liquid jet target.

The orientation of the target may be adjusted or controlled by the target adjustment means, which may be employed to move the target to a different position, redirect the orientation of the target, or otherwise change the position of the intended point of interaction with the electron beam. The target adjustment means may be operated in response to input from the target orientation sensor in a closed loop or feedback control in order to facilitate and improve adjustment and alignment of the X-ray source.

The inventors have realized that by using a controller for analyzing input from a sensor indicating a spatial relation between the electron beam and the target, or an intended position of the target, and for causing an adjustment means to adjust the spatial relation based on the sensor input, the alignment process of the X-ray source can be facilitated. The controller allows for the manual steps otherwise required for aligning the X-ray source to be reduced or even eliminated. Thus, the alignment processes that previously were known as work intensive and time consuming may now be performed in an automated and faster way, resulting in a reduced downtime of the system. This also allows for the adjustment of the alignment to be performed more often, compared to what is possible when using manual adjustment.

By "alignment" is meant an orientation of the electron beam or the target relative a reference. The reference may for example be an intended position in space, a reference point or structure of the X-ray source, or an optical axis of an electron-optical system. Alternatively, or additionally the alignment of the electron beam may relate to its position, or orientation, relative to the target, whereas the alignment of the target may refer to a position or orientation relative the electron beam or electron spot.

The term "orientation" may be understood as a relative position or direction of something, whereas "position" may be understood as a location or place of something and "direction" as the course along which something moves. Thus, the orientation of the electron beam may refer to its direction of propagation and/or actual position within the vacuum chamber of the X-ray source. Adjusting the orientation of the electron beam may hence result in a change of position of the interaction region, i.e., the point or region in which the electron beam impinges (or is intended to impinge) on the target. Accordingly, the orientation of the target may refer to the course along which it moves, and/or actual location within the X-ray source. Changing the orientation of the target may therefore result in a corresponding change in interaction region. Consequently, an adjustment of the orientation between the target and the electron beam may be achieved by adjusting the orientation of the target, the electron beam or both.

According to an embodiment, the X-ray source may comprise electron-optical means configured to adjust an orientation of the electron beam. The electron-optical means may further be employed for providing a signal indicating the orientation of the electron beam. This further signal may be received by the controller, which may be configured to cause the adjustment means to adjust the relative orientation between the anode electrode and the cathode based on this further signal. Thus, the electron-optical means may be used for generating input to a feedback loop for adjusting the alignment of the electron beam.

The electron-optical means may comprise one or several alignment coils and/or a deflector, comprising e.g. deflection plates, configured to generate a field that affects the propagation path of the electron beam. In this case, the further signal may indicate a strength of the field, and thus an orientation of the electron beam passing through the electron-optical system. A relatively high field may imply that the alignment coil has a relatively high impact on the orientation of the electron beam, whereas a relatively low field may imply a relatively low impact on the electron beam.

The electron-optical means may hence be used as an additional sensor generating input that the controller can use for improving the alignment process. In one example, a coarse alignment may be achieved by the adjustment means, followed by a fine tuning with the electron-optical means such that the electron beam can interact with the target at the intended target position. The further signal, indicating the orientation of the electron beam (or the degree of adjustment caused by the electron-optical means) may then be used as input for a further adjustment of the adjustment means, with the aim of achieving an as correct alignment as possible by means of the adjustment means. Put differently, the further signal may be used as input in a control loop aiming at reducing the action or contribution from the electron-optical means. In case the further signal indicates the field generated by the alignment coil, the controller may be used to cause the adjustment means to adjust the relative orientation between the anode and the cathode such that the field required by the alignment coil is reduced or at a minimum.

The present embodiments are advantageous in that they allow for the X-ray source to be aligned while using a relatively low field applied by the electron-optical means. Reducing the field is advantageous in that it may result in a reduced astigmatism induced by the electron-optical means.

In an embodiment the alignment may be adjusted so that the electron beam does not move when an electron beam focus is changed. This corresponds to an alignment where the electron beam travels along an optical axis through the center of a focusing lens.

According to some embodiments, the cathode may be attached to a movable flange allowing the relative orientation between the anode electrode and the cathode to be varied by means of the adjustment means. The adjustment means may for example be provided in the form of an actuator or motor operating on the flange, which in turn may be pivotally connected to a ball joint allowing the flange to move in different directions. The flange may be arranged so as to allow the orientation or tilting angle of the cathode to be varied from the outside, i.e., outside a chamber or protected environment wherein the cathode may be located. The flange may thus protrude to the outside of the chamber to allow an adjustment of the relative orientation between the anode electrode and the cathode without direct access to the cathode. This may facilitate adjustment and reduce downtime of the system.

The flange may for example be operably connected to two or more actuators arranged to adjust an angular position of the flange relative a direction of the electron beam. The actuators or motors may in turn be operated or controlled by the controller as described above. Further, a bellows may be provided between the moving parts (flange) and stationary parts (chamber, anode electrode) to ensure vacuum integrity or hermeticity of the chamber.

Alternatively, or additionally the anode electrode may be movable relative the cathode so as to enable adjustment of the orientation of the electron beam. This may for example be achieved by means of electro-mechanical actuators that are operably connected to the anode electrode and which can be operated by the controller.

It will be appreciated that the cathode and/or the anode electrode can be adjusted or moved both in a rotational manner and in terms of translation.

According to an embodiment, the target may be provided in the form of a liquid jet, in particular a liquid metal jet. Thus, the X-ray source may comprise a target generator configured to generate the metal jet forming the target passing through an interaction region in which the target material may interact with the electron beam. The term "liquid target" or "liquid anode" may, in the context of the present application, refer to a liquid jet, a stream or flow of liquid being forced through e.g. a nozzle and propagating through the interior of the chamber or housing. Alternative embodiments of liquid target may include multiple jets, a pool of liquid either stationary or rotating, liquid flowing over a solid surface, or liquid confined by solid surfaces.

According to the present embodiment, the beam orientation sensor may be arranged behind the target, as seen in the direction of the electron beam, and such that the target may at least partially obscure the sensor. This configuration allows for a position of the electron beam to be determined in relation to the target, for example by scanning the electron beam into and out of the target and observing the resulting signal received at the sensor. Alternatively, or additionally, the position of the electron beam may be determined relative to the sensor by scanning the electron beam into and out of a sensor area. The position of the target may be determined in a similar way, i.e., by scanning the electron beam over the target and observing the resulting signal at the sensor. Thus, the sensor may also be used as a target orientation sensor.

According to an embodiment, the beam orientation sensor and/or target orientation sensor may be configured to monitor a quality measure indicating a performance of the X-ray source. The quality measure may for example indicate a physical property of the target, such as for example width, shape or temperature, which in turn may affect the overall performance of the X-ray source and the generated X-ray radiation. A deviating quality measure, or malperformance of the target, may result in a corrective action of adjusting the orientation of the target or replacing the target.

According to an embodiment, the beam orientation sensor and/or target orientation sensor may be configured to monitor an interaction between the target and the electron beam. The sensor(s) may for example measure, directly or indirectly, the amount of X-ray radiation generated from the interaction, the number or electrons scattered from the target, transmitted through the target, passing by the target, or secondary electrons generated by the electron beam. All these parameters may be used to determine or indicate the interaction between the electron beam and the target, and a performance of the X-ray source in terms of its ability to produce desired X-ray radiation. The signal from the sensor (s) may be used as input for the controller when adjusting the alignment of the electron beam and/or the target.

According to an embodiment, the X-ray source may comprise a target generator. Examples of targets provided by such a generator include a metal jet, a travelling band, and a travelling string. These types of targets are advantageous in that they allow for new target material to be provided at the interaction region in a continuous manner, facilitating temperature control and enabling a high quality of the target.

According to an embodiment, the target adjustment means may be configured to adjust an orientation of a nozzle of the target generator. This allows for the orientation of the liquid metal jet to be adjusted for example in connection with maintenance of the X-ray source or replacement of the nozzle. The adjustment may for example be achieved by means of an actuator arranged to operate on the nozzle so as to change its position or direction. The nozzle may be adjusted based on its relative position to the electron beam, or a signal indicating an interaction between the target and for example the electron beam. The signal may however indicate other interactions as well, such as an interaction between the target and a sensor means, such as electromagnetic coils arranged to interact with the target, or a photodiode detecting a position of the target. In one example, an imaging device may be utilized to acquire an image of the target. An orientation of the target may then be determined and compared with a prior orientation or reference position in another image, such as a stored reference image of a target generated by another nozzle. These images may be acquired by repeatedly scanning the electron beam over the target and measuring a current received at a sensor area downstream of the target in the direction of the electron beam, or by taking a picture of the target.

Alternatively, an orientation of the target may be determined by measuring the intensity of the electron beam downstream from the target. A signal indicating the orientation of the target can then be obtained, for example, based on a sensor signal indicative of the intensity of the electron beam downstream from the target. If the electron beam is not obscured by the target, a maximum intensity will be measured downstream, and a minimum intensity will be measured when the electron beam is maximally obscured by the target. The degree to which the electron beam is obscured by the target, as measured in terms of the intensity of the electron beam downstream from the target, will thus be indicative of the relative position between the electron beam and the target. If the orientation of the electron beam is known, the orientation of the target may thus be found based on a sensor signal indicative of the intensity of the electron beam downstream from the target. Preferably, such sensor signal is acquired while scanning the electron beam over the target.

According to an embodiment, alignment between the X-ray source and external X-ray optics, e.g. a mirror, and/or a sample position may be required. This may be accomplished by moving the X-ray source relative to the X-ray optics and/or the sample position. For the particular case of a liquid jet source this could be constrained to movement in a direction along the electron beam. Adjustments along the jet flow direction can be accomplished by utilizing the electron optics to move the electron beam. Adjustments perpendicular to the electron beam and the jet flow direction are normally not needed because of the comparatively large depth of focus of the X-ray optics. Movement of the mirror a few millimeters from the optimal position may in a typical setup give a performance decrease of a few percent. Considering that a nozzle exchange might induce a position shift of about 0.2 mm, adjustments in this direction will in many cases not be required.

The technology disclosed herein may be embodied as computer readable instructions for controlling a programmable computer in such manner that it causes an X-ray source to perform the method outlined above. Such instructions may be distributed in the form of a computer-program product comprising a non-volatile computer readable medium storing the instructions.

It will be appreciated that any of the features in the embodiments described above for the method according to some aspects may be combined with the devices according to the other aspects.

Further objective of, features of, and advantages with the present invention will become apparent when studying the following detailed disclosure, the drawings and the appended claims. Those skilled in the art will realize that the different features of the present invention can be combined to create embodiments other than those described in the following.

BRIEF DESCRIPTION OF DRAWINGS

The invention will now be described for the purpose of exemplification with reference to the accompanying drawings, on which.

All figures are schematic, not necessarily to scale, and generally only show parts that are necessary in order to elucidate the invention, wherein other parts may be omitted or merely suggested.

DETAILED DESCRIPTION

Figure 1:
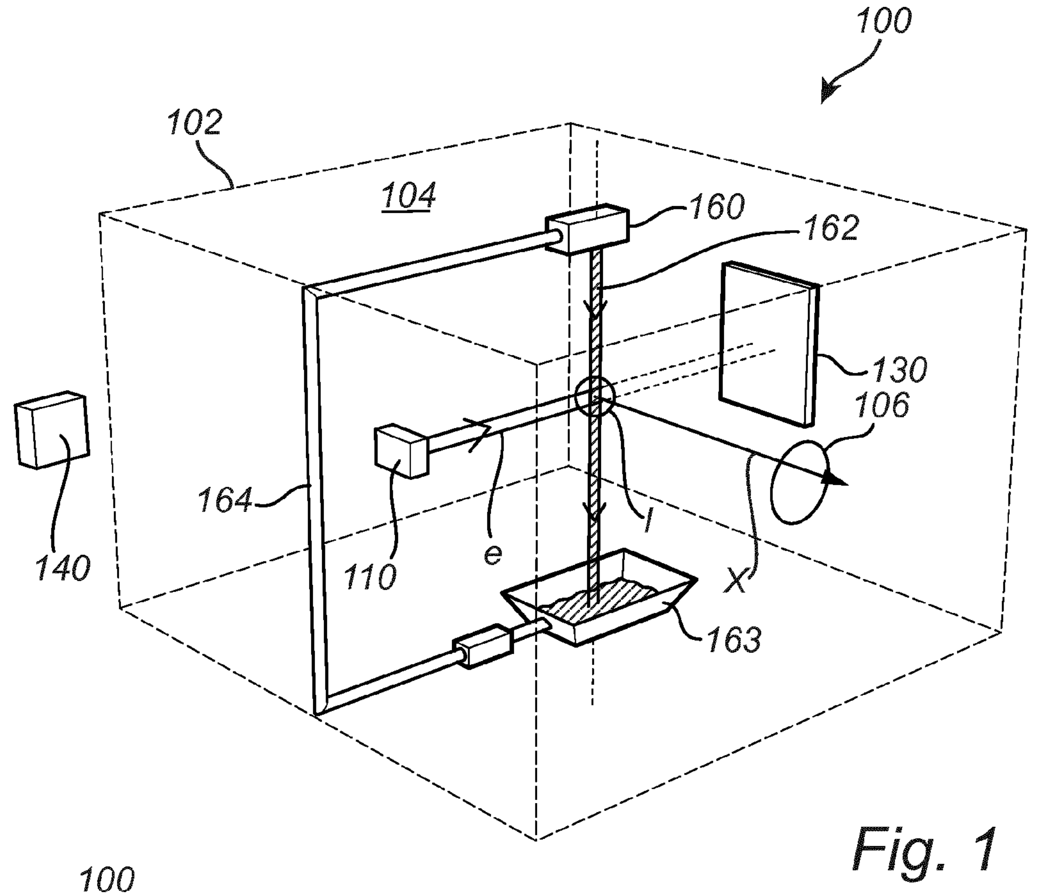
FIG. 1 is a schematic illustration of an X-ray source in a perspective view.

An X-ray source 100 according to an embodiment of the invention will now be described with reference to FIG. 1. As indicated in FIG. 1, a low pressure chamber, or vacuum chamber 104 may be defined by an enclosure 102 and an X-ray transparent window 106 which separates the low pressure chamber 104 from the ambient atmosphere. The X-ray source 100 may comprise a target generator, such as a liquid jet generator 160 configured to form a liquid jet 162 moving along a flow axis passing through an interaction region, or target position I. The liquid jet generator 160 may comprise a nozzle through which liquid, such as e.g. liquid metal may be ejected to form the liquid jet 162 propagating towards and through the interaction region I. The liquid jet 162 propagates through the interaction region I, towards a collecting arrangement 163 arranged below the liquid jet generator 160 with respect to the flow direction.

The X-ray source 100 further comprises an electron source 110 configured to provide an electron beam e directed towards the interaction region I. The electron source 110 may comprise a cathode and an anode electrode (not shown in FIG. 1) for the generation of the electron beam e. In the interaction region I, the electron beam e interacts with the liquid jet 162 to generate X-ray radiation, which is transmitted out of the X-ray source 100 via the X-ray transparent window 106. The X-ray radiation is here transmitted out of the X-ray source 100 in a direction substantially perpendicular to the direction of the electron beam e.

The liquid forming the liquid jet is collected by the collecting arrangement 163, and is subsequently recirculated by a pump via a recirculating path 164 to the liquid jet generator 160, where the liquid may be reused to continuously generate the liquid jet 162.

A sensor arrangement, such as a beam orientation sensor 130 is here illustrated as part of the X-ray source 100. The beam orientation sensor 130 may be configured to monitor a relative position or orientation of the electron beam e and the target 162, and/or a quality measure indicating a performance of the X-ray source. The sensor 130 may be arranged to receive at least part of the electron beam e passing the liquid jet 162. The sensor may thus be an electron detector arranged behind the interaction region I as seen from a viewpoint of the electron source 110. In case the liquid jet 162 moves or changes shape, at least part of the electron beam e may pass the liquid jet 162 and interact with the electron detector 130. Thus, the electron detector 130 may monitor a quality measure indicating a relative orientation or alignment of the target 162 and the electron beam e.

A controller, or processing unit 140 is here also illustrated as part of the X-ray source 100. The controller 140 may be arranged inside or outside the low pressure chamber 104, and the person skilled in the art appreciates that other possible arrangements of the processing unit 140 are possible within the scope of the appended claims. Thus, the controller 140 and the X-ray source 100 may be implemented in a single physical or logical entity, or as communicating parts of a distributed network.

Figure 2:
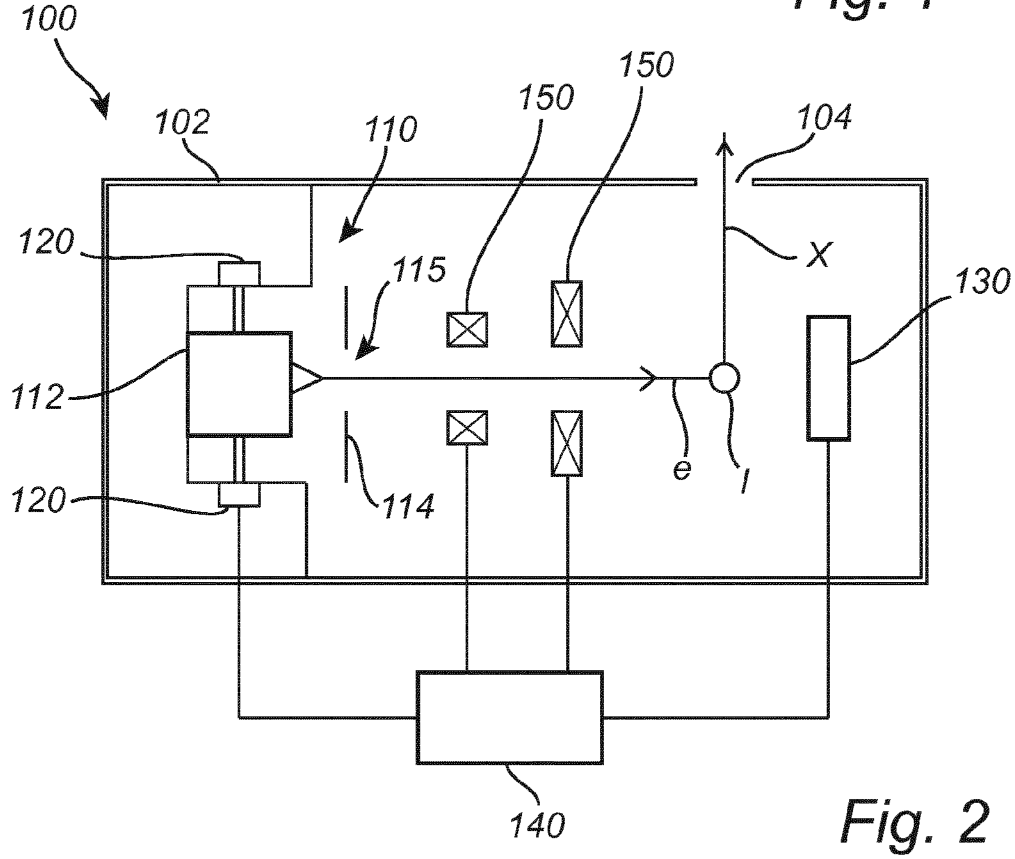
FIG. 2 is a schematic cross section of an X-ray source.

FIG. 2 is a schematic view of an X-ray source 100 according to an embodiment. The present X-ray source 100 may be similarly configured as the X-ray source 100 described in connection with FIG. 1.

As illustrated, the X-ray source 100 may comprise an electron source 110, comprising a cathode 112 and an anode electrode 114. The cathode 112 may be a hot cathode 112 which is heated to create a stream of electrons via thermionic emission. Further examples of cathodes 112 include a thermionic cathode, and a thermal-field or cold-field charged-particle source. The emitted electrons may then be accelerated towards the anode electrode 114 by means of an electric field applied between the cathode 112 and the anode electrode 114, and exit the electron source 110 through a hole

115 defined by the anode electrode 114. The anode electrode 114 may form part of an enclosure of the electron source 110, be arranged as a separate element, and/or form part of an arrangement of a plurality of electrodes generating a desired electric field for creating the electron beam e.

The orientation of the cathode 112 and the anode electrode 114 may determine the orientation of the electric field that accelerates the emitted electrons. The orientation of the electric field and the position of the aperture 115 through which the resulting electron beam e is emitted from the electron source 110 may in turn define the direction, or trajectory, of the electron beam e. Thus, by changing the relative orientation between the anode electrode 114 and the cathode 112, the orientation of the electron beam e may be controlled. In the present embodiment, this may be performed by means of an adjustment means 120, such as an adjustment screw 120 operated by a controller 140. The adjustment screw 120 may be configured to adjust a position of the cathode 112 in relation to the anode electrode 114. The adjustment may for example be realized by tilting, or rotating, the cathode 112 so as to change the position from which the electrons are emitted. In the present example, the adjustment means 120 is arranged within the vacuum chamber defined by the enclosure 102. The adjustment means 120 may however in some examples be arranged outside the vacuum chamber, from which it may be accessed without affecting the environment in the vacuum chamber. A more detailed example of an electron source 110 and adjustment means 120 will be discussed in connection with FIG. 3.

The X-ray source 100 may further comprise electron-optical means 150 configured to adjust the orientation of the electron beam e emitted from the electron source 110. The electron-optical means 150 may for example comprise one or several magnetic and electrostatic lenses and/or deflection plates arranged to act upon the electrons so as to affect their trajectories and thus the shape and orientation of the electron beam e. A correlation between the strength of the applied field and the effect on the electrons can be assumed, which allows for the strength of the applied field to be used as a measure of the degree to which the electron-optical means 150 affects the electron beam.

The electron optical means 150 may comprise (see FIG. 4*a*) a deflection means 154 arranged for deflecting the electron beam in different directions and a focusing means 152 arranged for focusing the electron beam on the target in an electron spot. A size of the electron spot may be adjusted by adjusting a focus setting applied to the focusing means.

The electron-optical means 150 may be controlled by the controller 140 and may hence be used together with the adjustment means 120 of the electron source 110 to point the electron beam e in a desired direction. A particular example will now be described, in which the electron-optical means 150 is employed to verify and/or control the relative orientation between the cathode 112 and the anode electrode 114 of the electron source 110.

In a first step, an initial setting of the adjustment means 120 is selected. The initial setting may for example be based on a stored setting, which may be a statistically determined first estimate, or used in a prior setting (for example the last known setting used prior to maintenance or replacement of the electron source 110). The initial setting of the adjustment means 120 results in an electron beam e having a certain trajectory. This trajectory can be adjusted by the electron-optical means 150, such that the electron beam e impacts on, or passes through, a desired position. The electron-optical means 150 may for example be employed to fine-tune the trajectory of the electron beam e such that it is given a correct alignment relative the target, or impacts a sensor 130 at a desired position.

The contribution from the electron-optical means 150 may now be used by the controller to determine if the initial setting of the adjustment means 120 is acceptable or if it needs to be changed. The controller may base this decision on the following reasoning:

- A relatively low contribution from the electron-optical means 150 indicates that the initial setting of the adjustment means 120 is a relatively correct ansatz. In other words, the relative orientation between the cathode 112 and the anode electrode 114 of the electron source 110 results in an electron beam that has an initial orientation that only requires minor adjustments to fulfil an alignment criterion with respect to the intended target position.
- A relatively high contribution from the electron-optical means 150 indicates that the setting of the adjustment means 120 may be improved. Thus, the initial ansatz should be replaced by another setting that may result in an electron beam path that requires less fine-tuning by the electron-optical means 150 to achieve a desired orientation of the electron beam e.

Hence, the controller 140 may use the adjustment means 120 and the electron-optical means 150 in a feedback loop for automatically aligning the electron beam e. The aligning may for example be performed in connection with service or maintenance of the X-ray source 100, and/or regularly during operation of the X-ray source 100 so as to maintain a high performance and to compensate for wear and ageing of the X-ray source 100.

Figure 3A:
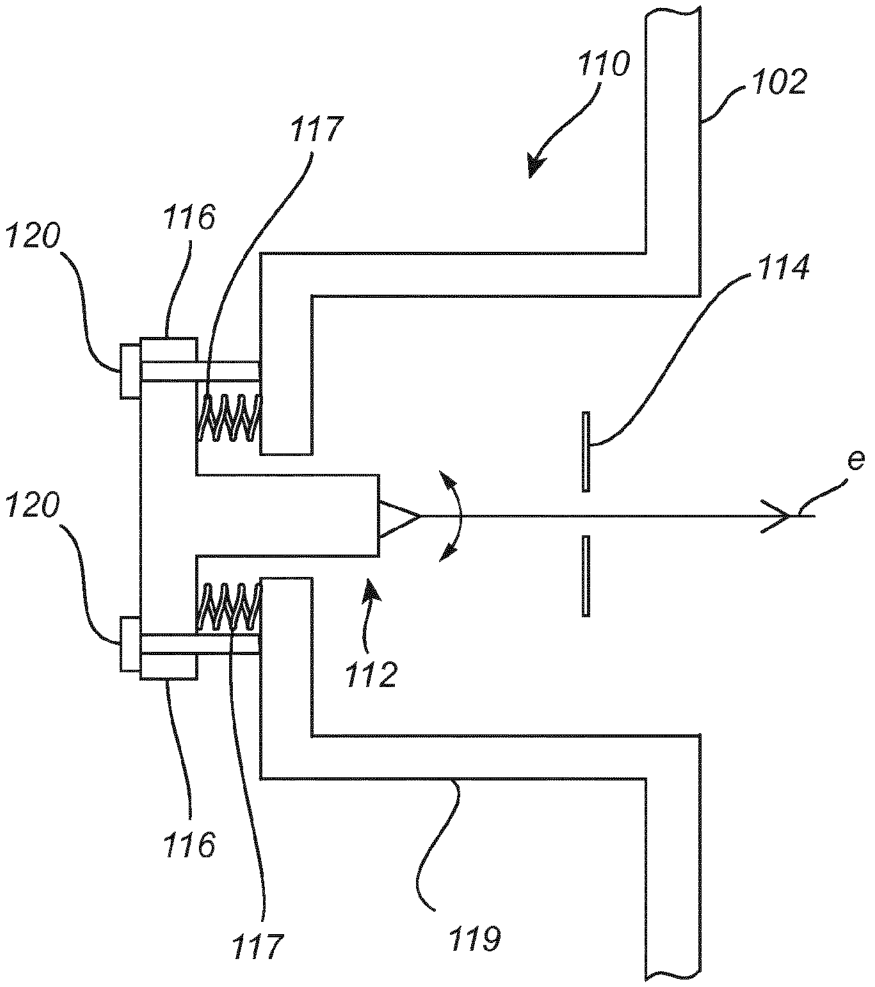
FIG. 3*a* is a cross section of an electron source of an X-ray source.
Figure 3B:
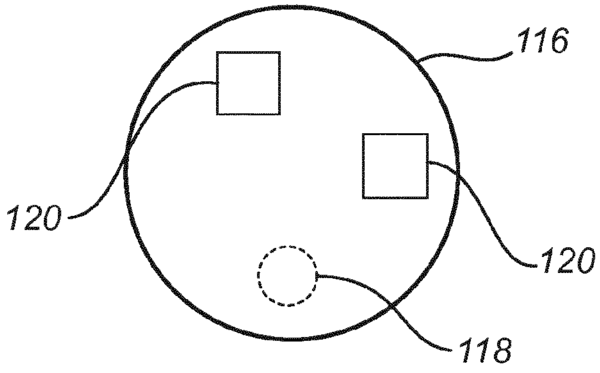
FIG. 3*b* is a side view of a flange of the electron source of FIG. 3*a;*

FIGS. 3*a* and 3*b* are schematic illustrations of an electron source 110 according to an embodiment that may be similarly configured as the embodiments discussed above in connection with FIGS. 1 and 2. In the present example, the electron source 110 comprises a cathode 112 that is attached to a movable flange 116 that allows for the relative orientation between the cathode 112 and the anode electrode 114 to be varied. The cathode 112 may be movable relative to a housing 119 enclosing the electron-emitting portion of the cathode and the anode electrode 114. The housing 119 may be connected to the enclosure 102 defining the vacuum chamber, and a sealing 117 may be provided between the flange 116 and the housing 119, such as a bellows structure 117 for allowing a relative movement between the flange 116 and the housing 119 without affecting the environment in the vacuum chamber.

The orientation of the flange 116 may be varied by adjustment means 120, such as a first and a second actuator 120 arranged to control an angular orientation of the cathode 112. The actuators 120 are illustrated in the cross section of FIG. 3*a*, controlling the gap between the flange 116 and the wall of the housing 119. Examples of actuators include piezoelectric actuators, electromagnetic actuators, linear motors (voice coils), and rotating motors with suitable gear arrangements. In the present example, the actuators 120 are arranged outside the vacuum chamber. In this configuration the vacuum may be used as a preload for the actuators, i.e. the atmospheric pressure will provide a force on the flange 116 that the actuators 120 must overcome to increase the gap between the flange 116 and wall of the housing 119. As shown in FIG. 3*a*, a reduction of the distance between the upper part of the flange 116 and the housing wall 119 may result in a tilting movement of the cathode 112, such that the position of the electron-emitting part of the cathode 112 is lowered. Vice versa, a reduced distance between the lower part of the flange 116 may result in the electron-emitting part of the cathode 112 being raised to a higher position in relation to the anode electrode 114. To prevent inadvertent breaking of the vacuum seal by excessive motion of the actuators 120 mechanical stops may be provided (not shown).

FIG. 3*b* shows a side view of the flange 116 of FIG. 3*a*, wherein the flange 116 is pivotally connected to the housing 119 via a ball joint 118 (position indicated by a dashed line in FIG. 3*b*). The actuators 120 may be arranged to cooperate with the ball joint 118 to provide a desired angular adjustment of the flange 116 around the ball joint 118. By displacing the actuators along a common direction it is possible to tilt the flange around an axis passing through the ball and being parallel to a line connecting the two actuators, whereas displacing the actuators in opposite direction gives the ability to tilt the flange around an axis passing through the ball in a direction perpendicular to the line connecting the two actuators. In the present example shown in FIG. 3*b*, displacing the actuators along the common direction allows for the cathode to be tilted in an upward or downward direction of the figure, whereas displacing the actuators in opposite direction allows for the cathode to be tilted in a sideway direction of the figure.

Figure 4A:
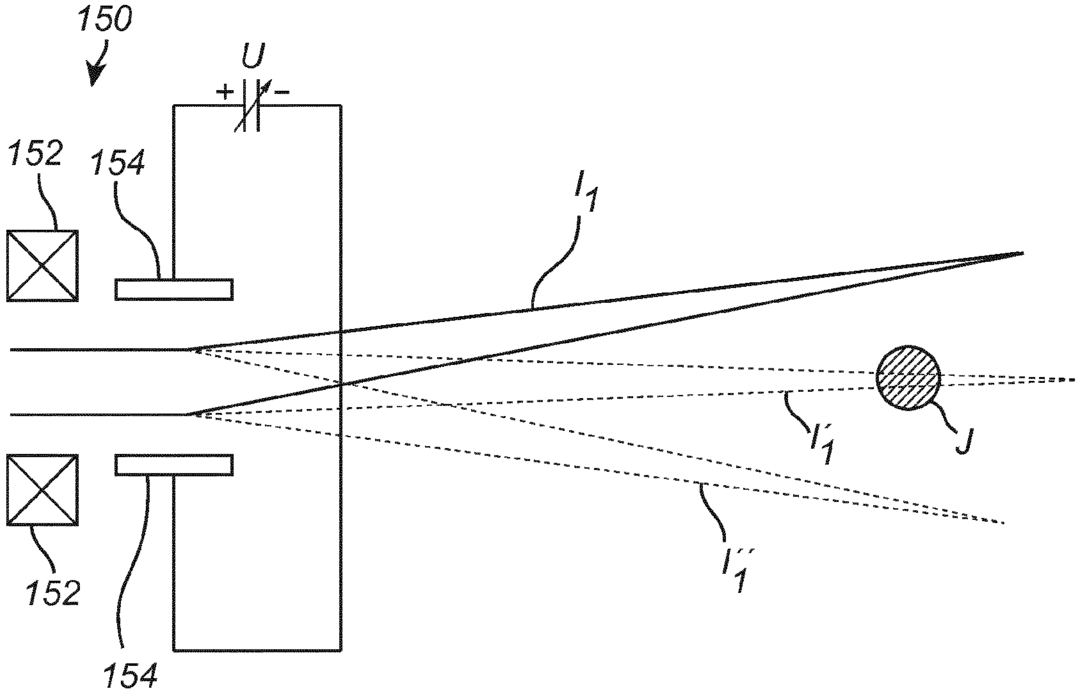
FIGS. 4*a* and 4*b* illustrate an alignment process of the electron beam relative to the target.

FIG. 4*a* shows an electron-optical means 150 and a target J of an X-ray source according to an embodiment, which may be similarly configured as the embodiments discussed in connection with FIGS. 1 to 3. FIG. 4*a* is drawn in a plane of deflection of the electron beam e, and shows the beam in three different deflection orientations I1, I1', I1", each of which corresponds to a setting of a deflection means 154 of the electron-optical means 150. It is emphasized that the angle of the beam has not been drawn to scale, but the beam position above (I1), inside (I1') and below the target (I1") represent a small angular range, so the beam can be captured by a sensor (not shown) located further downstream.

Figure 4B:
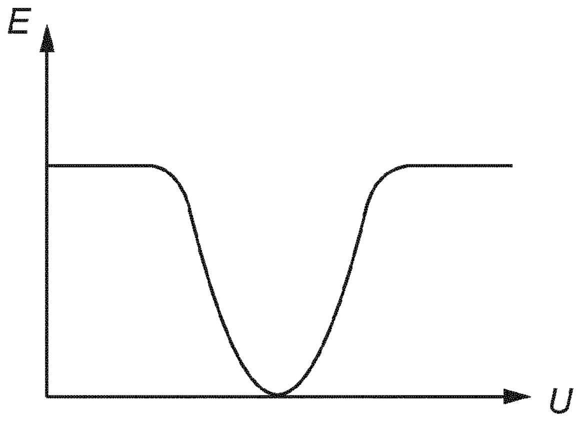

The alignment of the electron beam e relative the target J can be determined by scanning the beam over the target J by means of the deflection means 154 while recording the signal from the sensor downstream of the target J for each of a plurality of deflection-means settings U. Such a data set is plotted in FIG. 4*b*. If the target J overlaps with the sensor area, its presence will manifest itself as an interval in which the sensor signal E is reduced or near-zero. The minimum of the plotted curve corresponds to the deflection-means setting U that results in the beam position inside (I1') the target.

It is emphasized that the recording of the sensor-signal values E need not be performed as a function of the settings of the electron-optical means 150. It may in fact be preferable to record the values for different relative alignments of the cathode and the anode electrode (not shown in FIGS. 4*a* and 4*b*) in order to determine a preferred setting of the adjustment means.

The electron beam may be scanned over the sensor area by means of the deflection means 154 so that it is deflected out of the sensor area. In this way a setting of the deflection means corresponding to particular position of the electron beam may be determined or alternatively the position of the undeflected electron beam may be obtained. To decide if the alignment is sufficient, a change in position of the electron beam for two different focusing means (152) settings may be determined; provided this change is within a pre-determined range alignment may be considered good enough. The relative orientation between the cathode and the anode electrode may be adjusted until this criterion is fulfilled. Provided that the mechanical tolerances are sufficient a procedure that ensures predicted motion of the electron beam when the electron beam focus is changed may result in satisfactory performance, i.e. no further alignment of the electron beam may be required. This may simplify the electron optical means 150 in the sense that no alignment coils are needed.

In an embodiment, the desired alignment of the electron beam is along the optical axis of the focusing lens. To achieve this the relative orientation between the cathode and the anode electrode may be adjusted until the motion of the electron beam is negligible when the electron beam focus is changed. Thus, in this embodiment the pre-determined range discussed above would correspond to a pre-determined limit value. In other words, the alignment may be adjusted until the difference in electron beam position for different focusing means settings is below a pre-determined limit value.

Figure 5:
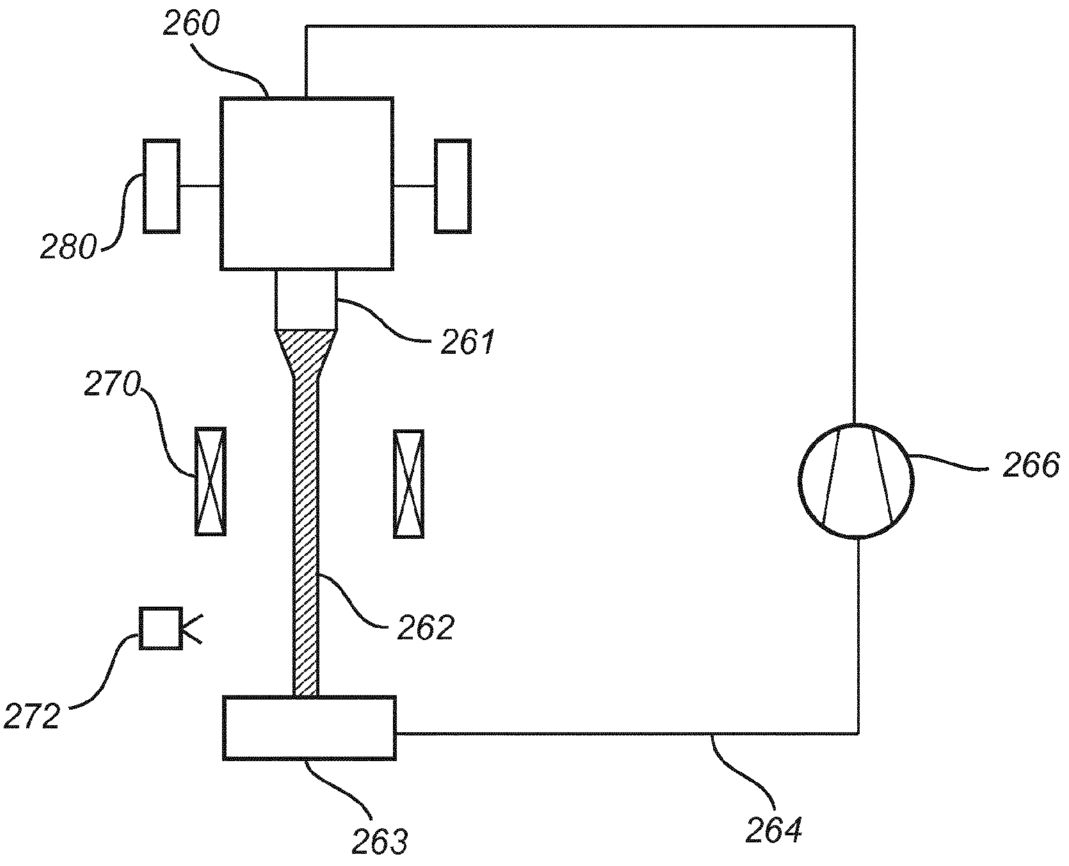
FIG. 5 illustrates a target generator of an X-ray source.

FIG. 5 is a schematic illustration of a target generator 260 according to an embodiment. The target generator 260 may be comprised in an X-ray source according to any one of the embodiments discussed above in connection with FIGS. 1-4. In the present example, the target generator 260 is configured to generate a target in the form of a liquid jet 262. The liquid jet 262, i.e., the target, may be formed by the target generator 260 comprising a nozzle 261 through which a fluid, such as a liquid metal or liquid alloy, may be ejected to form the liquid target 262. It should be noted that an X-ray source according to embodiments of the present inventive concept may comprise multiple liquid targets, and/or multiple electron beams. Although a liquid metal is used in preferred embodiments of the present invention, it is also conceivable that other liquid targets are used such as liquid xenon.

The liquid jet 262 may be collected and returned to the target generator 260 by means of a collecting reservoir 263 connected to a conduit system 264 and a pump 266, such as a high-pressure pump, adapted to raise the pressure of the liquid. The pressure may be at least 10 bar, and preferably at least 50 bar, for generating the liquid jet.

The X-ray source may further comprise a target adjustment means 280 for adjusting the orientation of the target relative to the orientation of the electron beam e. The adjustment means 280 may be arranged within the enclosure 102 (not shown in FIG. 5), or outside the vacuum chamber. Arranging the adjustment means 280 outside the chamber may be advantageous in terms of a reduced risk of contaminating the chamber with contaminants originating from motors, gear mechanisms, lubricants and other elements of the adjustment means 280. The adjustment means 280 may in some examples operate on the target generator 260, for example by rotating and/or translating the target generator 260 so as to affect the orientation of the generated target. Alternatively, or additionally, the target adjustment means may operate directly on the target so as to move or adjust a position of the target and thus the relative orientation between the target and the electron beam. Further, it is emphasized that the target adjustment means may operate in combination with the adjustment means for adjusting the electron beam.

In the present example illustrated in FIG. 5, the target adjustment means 280 is configured to adjust a position of the target generator 260, and in particular the orientation of the nozzle 261 ejecting the liquid forming the liquid jet 262. This may be performed by means of an actuator, such as a motor, operating on an adjustment mechanism such as an adjustment screw. Preferably, the actuator is communicatively connected to the controller to allow an automated adjustment of the target orientation. Adjustment of the target position in a direction substantially perpendicular to a flow axis of the liquid jet and substantially perpendicular to the travelling direction of the electron beam may in some instances not be necessary, provided that the required adjustment is so small that the electron optical system may move the electron beam instead. This approach may be sufficient provided that the depth of focus of an external X-ray optic is sufficiently large. However, adjustments of target position along the travelling direction of the electron beam may not be omitted or replaced by movement of the electron beam in many cases. If the application is not sensitive to the precise location of the X-ray source, it may be enough to adjust the focus of the electron beam to retain the desired spot size at a slightly displaced position. In many cases this may not be preferred since a displacement of the X-ray spot in a direction perpendicular to the optical axis of the external X-ray optics may require re-alignment of the external optics and/or the sample intended to receive the X-ray radiation.

Still referring to FIG. 5, a magnetic field generator 270 is shown in relation to the liquid jet 262. The magnetic field generator may comprise a plurality of means for generating a magnetic field interacting with the liquid target 262. Examples of such means may include electromagnets, which may be arranged at different sides of a path of the liquid target 262.

The magnetic field generator 270 may in some examples be used as a target adjustment means for adjusting a shape or position of the target, preferably in the interaction region. Alternatively, or additionally, the magnetic field generator 270 may be used as a target orientation sensor configured to generate a signal indicating an orientation of the target 262. The sensor function may utilize the interaction between the target and the magnetic field to gain knowledge about an actual position of the target, or a change in position relative the magnetic field. The magnetic field generator 270 may be connected to the controller 140 so as to provide the controller 140 with information about the orientation of the target, and/or allow the controller 140 to use the magnetic field generator 270 as a target adjustment means for modifying the orientation of the target.

FIG. 5 further illustrates an imaging device, such as a camera 272, arranged to acquire an image of the target 262. The signal from the camera 272 may be used to compare the current position of the target 262 with a prior position or reference position of the target. In one example, the prior position information corresponds to a stored reference image of a target 262 generated by a previous nozzle. It should be noted that the camera 272 can be arranged to observe other parts of the system as well, such as a reference structure indicating a position of the target generator 260 or the nozzle 261 ejecting the liquid jet 262.

The camera 272 may be used to provide a coarse, initial alignment of the target after e.g. replacement of the nozzle 261. The coarse alignment may then be fine-tuned by any of the alignment procedure discussed above in connection with the previous embodiments.

In some embodiments, the X-ray source may comprise a sensor for monitoring a quality measure indicating a performance of the X-ray source. The quality measure may for example relate to the characteristics of the generated X-ray radiation, such as intensity or brilliance. Further, the X-ray source may comprise a sensor indicating the interaction between the target and the electron beam e. The interaction may for example be characterized by the number of electrons scattered by the target, absorbed by the target or passing by the same, and the number of secondary electrons present in the chamber. The interaction may also be characterized by the generated X-ray radiation.

The above parameters may be used to gain knowledge about the alignment between the target and the electron beam, and to determine how to operate the beam adjustment means and/or the target adjustment means.

By providing a sensor area downstream of the target in the travelling direction of the electron beam the relative orientation between the electron beam and the target may be determined by scanning the electron beam over the target and measure the amount of electrons reaching the sensor area for different positions. Provided that the cross section of the electron beam is relatively small compared to the target, detecting the transitions from high to low current as the electron beam is obscured by the target, and correspondingly from low to high level as the electron beam is unobscured, may give a measure on target width as well as target position. A case, where the target generator has been replaced, will now be discussed as an illustrating example. By measuring the target position by means of scanning the electron beam over the target, a displacement of the target compared to the situation before the replacement may be determined. A displacement in a direction substantially perpendicular to the electron beam will result in a change in target position in that direction. A displacement in a direction along the electron beam will result in a change in apparent target width, provided the focus of the electron beam is not changed. By changing focus setting and repeating the scan it is possible to determine for which focus setting the target location corresponds to the minimum cross section of the electron beam. From this information the displacement in the direction of the electron beam may be obtained.

Similar considerations as above may be applied if instead a current absorbed by the target, or electrons scattered off the target, are measured. An incoming electron may either miss the target, be absorbed by the target, or scatter off the target. Thus, anyone of these three quantities may be measured while scanning the electron beam over the target to determine target orientation. A controller may use this information to adjust target orientation accordingly.

Another possibility may be to measure the X-ray radiation produced by the interaction between the electron beam and the target. By scanning the electron beam over the target the amounts of X-ray radiation will change from a small amount when the electron beam pass by the target to a large amount when the entire electron beam hits the target.

The above parameters may be determined by different types of sensors. In some embodiments, the X-ray source may comprise a beam orientation sensor 130 arranged behind the target as seen in the direction of the electron beam e. The beam orientation sensor 130 may be used to determine the number of electrons passing by the target, and which therefore not contribute to the generation of X-ray radiation. The number of scattered electrons, or secondary electrons, may be detected by electron detectors, such as e.g. electrodes connected to ammeters, arranged within the chamber. Further, the generated X-ray radiation may be measured by X-ray sensitive detectors arranged outside the chamber.

These sensors may be connected to the controller 140 so as to provide the controller 140 with information that can be used as feedback in an automated alignment process as described above.

Figure 6:
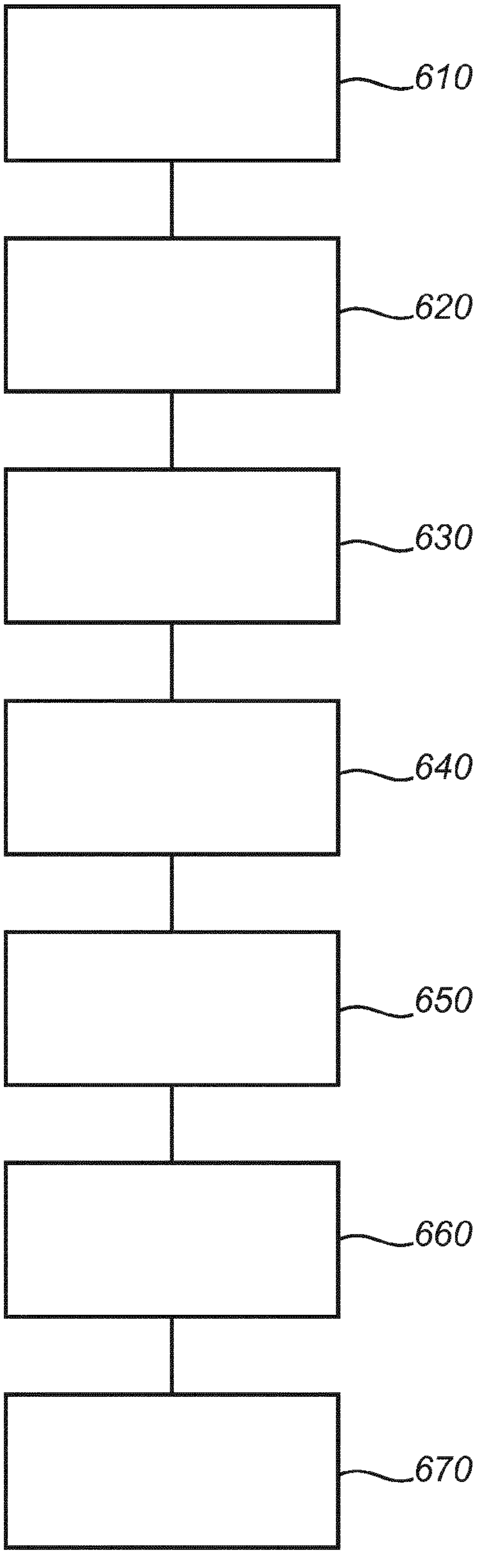
FIGS. 6 and 7 are flowcharts of methods for aligning X-ray sources according to the present invention.

FIG. 6 is a flowchart outlining a method according to an embodiment. The method may be performed in an X-ray source that may be similarly configured as the embodiments described in connection with FIGS. 1-5. In the present example, the method may comprise at least some of the following steps:

- emitting 610 electrons from the cathode 112;
- accelerating 620 the emitted electrons by means of the anode electrode 114 to form an electron beam e;
- generating 630 a signal indicating an orientation of the electron beam e relative to a target position;
- adjusting 640, by means of a controller 140, a relative orientation between the anode 114 and the cathode 112 based on the generated signal by means of the controller 140;
- adjusting 650, by means of an alignment coil 150, the orientation of the electron beam e based on the generated signal indicating the orientation of the electron beam e relative to the target position;
- monitoring 660 a further signal indicating a field generated by the alignment coil 150; and
- adjusting 670 the relative orientation between the anode electrode 114 and the cathode 112 such that the field required for achieving the desired alignment generated by the alignment coil 150 is reduced.

Another embodiment of the method (not illustrated) may comprise the steps:

- emitting electrons from the cathode 112;
- accelerating the emitted electrons by means of the anode electrode 114 to form an electron beam e;
- scanning the electron beam over a sensor area by means of the deflector 154 for two different settings of the focusing means 152;
- determining a position difference of the electron beam for the two different focusing means settings;
- adjusting the relative orientation between the anode electrode and the cathode so that the position difference is below a pre-determined limit value.

Figure 7:
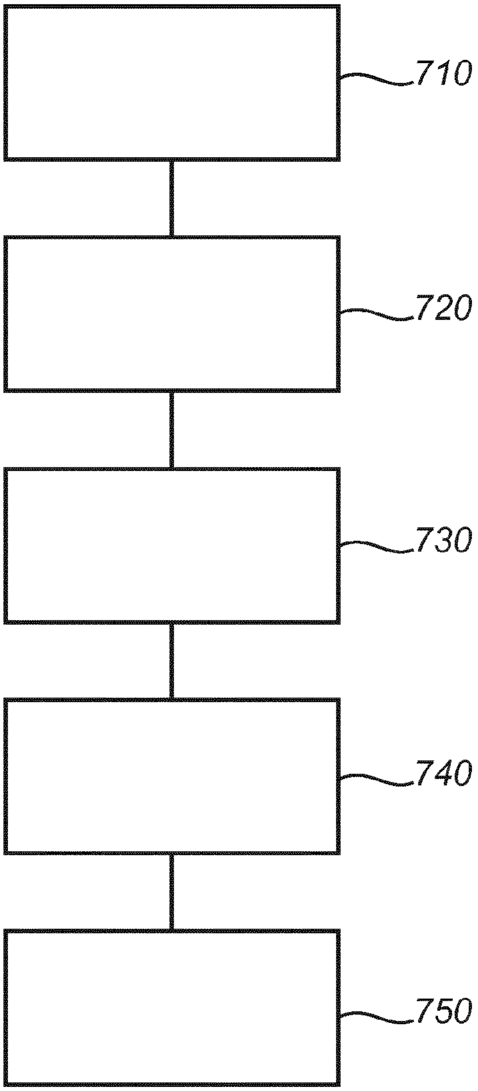

FIG. 7 is a flowchart outlining a method according to an embodiment. The method may be performed in an X-ray source that may be similarly configured as the embodiments described in connection with FIGS. 1-5. In the present example, the method may comprise at least some of the following steps:

- providing 710 an electron beam e directed towards a target such that the electron beam interacts with the target to generate X-ray radiation;
- generating 720 a signal indicating an orientation of the target relative to the electron beam;
- adjusting 730, by means of a controller 140, the orientation of the target based on the generated signal by means of the controller 140.

In case the target is a liquid jet 262 generated by a nozzle 261, the signal indicating an orientation of the target relative to the electron beam may be generated by an imaging device 272 viewing the target. If so, the method may comprise at step of adjusting 740 the orientation of the target 262 by moving the nozzle 261 until a current image of the target correlates to a previously acquired image of a previous target.

Alternatively, or additionally, the image indicating a position of the target 262 may be acquired by scanning 750 the electron beam e over the target 262.

The person skilled in the art by no means is limited to the example embodiments described above. On the contrary, many modifications and variations are possible within the scope of the appended claims. In particular, X-ray sources and systems comprising more than one target or more than one electron beam are conceivable within the scope of the present inventive concept. Furthermore, X-ray sources of the type described herein may advantageously be combined with X-ray optics and/or detectors tailored to specific applications exemplified by but not limited to medical diagnosis, non-destructive testing, lithography, crystal analysis, microscopy, materials science, microscopy surface physics, protein structure determination by X-ray diffraction, X-ray photo spectroscopy (XPS), critical dimension small angle X-ray scattering (CD-SAXS), and X-ray fluorescence (XRF). Additionally, variations to the disclosed examples can be understood and effected by the skilled person in practicing the claimed invention, from a study of the drawings, the disclosure, and the appended claims. The mere fact that certain measures are recited in mutually different dependent claims does not indicate that a combination of these measures cannot be used to advantage.

The invention claimed is:

1. A method for aligning an X-ray source, comprising:

- providing an electron beam directed towards a liquid jet target such that the electron beam interacts with the liquid jet target to generate X-ray radiation;
- scanning the electron beam over the liquid jet target;
- generating a signal indicating an orientation of the liquid jet target relative to an electron beam focus by monitoring a quantity indicative of an interaction between the electron beam and the liquid jet target as a function of electron beam position; and
- adjusting the orientation of the liquid jet target relative to the electron beam focus based on the generated signal;
- wherein the liquid jet target is generated by a nozzle and the method further comprises:
- generating an image of the liquid jet target by repeated scanning of the electron beam over the target and recording the quantity indicative of the interaction between the electron beam and the liquid jet target;
- adjusting the orientation of the target by moving the nozzle until a current image of the target correlates to a previously acquired image of a previous target.

2. The method according to claim 1, wherein the quantity indicative of an interaction between the electron beam and the liquid jet target is an intensity of the electron beam downstream from the liquid jet target.

3. The method according to claim 1, wherein the quantity indicative of an interaction between the electron beam and the liquid jet target is an intensity of the electrons scattered from the liquid jet target or an intensity of X-ray radiation generated by the interaction between the electron beam and the liquid jet target.

4. The method according to claim 1, wherein the step of adjusting is performed by means of a controller.

5. The method according to claim 1, wherein the target is adjusted in a direction along the electron beam.

* * * * *